United States Patent [19]

Severin et al.

[11] Patent Number: 5,167,799
[45] Date of Patent: Dec. 1, 1992

[54] APPARATUS FOR SIMULATING A FULL SCALE BELT FILTER PRESS

[75] Inventors: Blaine F. Severin, Okemos; Daniel J. Wagner, Mason; Hans E. Grethlein; Robert F. Hickey, both of Okemos, all of Mich.

[73] Assignee: Michigan Biotechnology Institute, Lansing, Mich.

[21] Appl. No.: 739,261

[22] Filed: Aug. 1, 1991

[51] Int. Cl.$^5$ .............................................. B01D 29/82
[52] U.S. Cl. ...................................... 210/85; 210/386; 210/400; 100/110; 100/131; 100/212
[58] Field of Search .................. 210/85, 386, 400, 401, 210/770, 783; 100/37, 110, 122, 125, 126, 131, 211, 212; 73/862.42, 862.55

[56] References Cited

U.S. PATENT DOCUMENTS

| | | | |
|---|---|---|---|
| 241,099 | 5/1881 | Walden | 73/862.42 |
| 2,795,984 | 6/1957 | Sladek | 100/212 |
| 4,446,023 | 5/1984 | Pierson | 210/400 |
| 4,472,279 | 9/1984 | Pierson | 210/386 |
| 4,568,460 | 2/1986 | Bratten | 210/387 |
| 4,861,495 | 8/1989 | Pietzsch | 210/739 |
| 4,879,034 | 11/1989 | Bastgen | 210/400 |
| 4,885,088 | 12/1989 | Sbaschnigg | 210/400 |

Primary Examiner—Robert A. Dawson
Assistant Examiner—Matthew O. Savage
Attorney, Agent, or Firm—Quarles & Brady

[57] ABSTRACT

An apparatus for simulating the operation of a full-scale belt filter press consists of a support base, a filter belt and a press belt each anchored at one end to the support base and passing over a static curved pressure face and a winch for exerting a pulling force on the press belt against the static curved press face to remove water from a sample of slurry on or within the belts. An improvement in the method of removing liquid from a slurry with a belt filter press also is disclosed which consists of pulling the pair of belts containing a slurry against a static curved pressure face to force liquid out of the slurry.

8 Claims, 1 Drawing Sheet

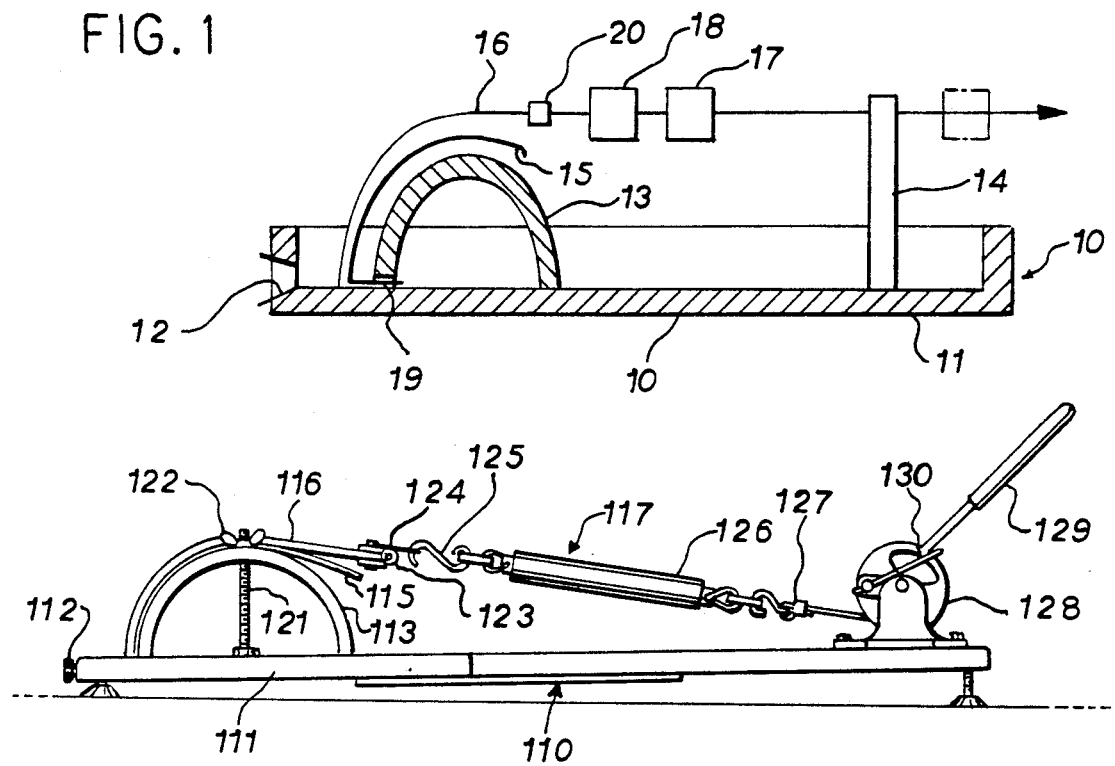
FIG. 1
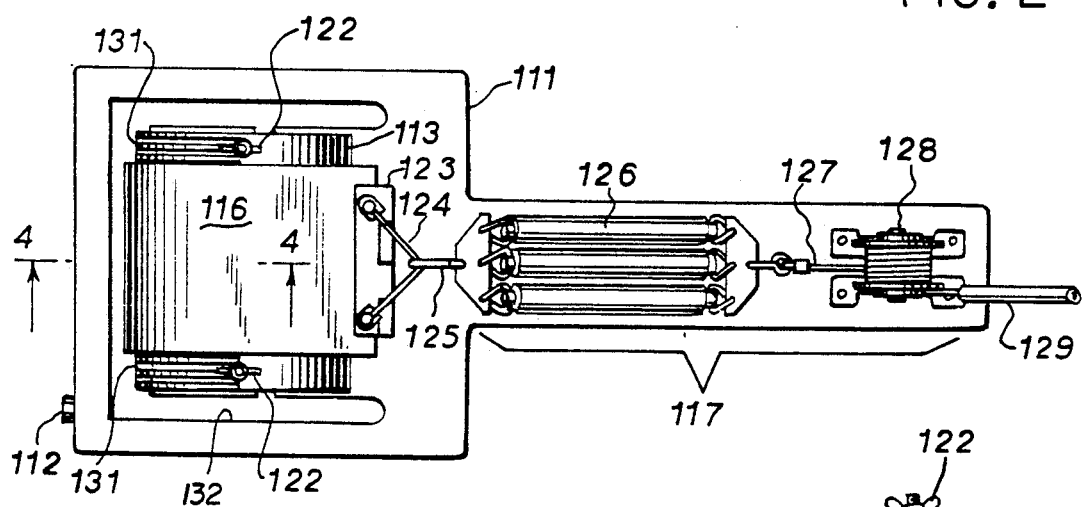
FIG. 2
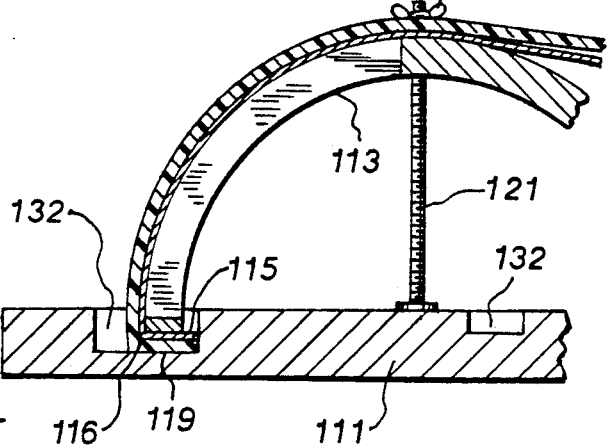
FIG. 3
FIG. 4

APPARATUS FOR SIMULATING A FULL SCALE BELT FILTER PRESS

FIELD OF THE INVENTION

This invention relates generally to the removal of liquids from slurries of solids with a belt filter. More particularly, it relates to a prototype apparatus for obtaining laboratory scale data for a full scale belt filter press operation and an improvement which increases the dewatering or deliquifying efficiency of belt filter press equipment.

BACKGROUND OF THE INVENTION

Slurries or sludges which require dewatering may be inorganic or organic, natural or manmade, fibrous or non-fibrous. Slurries usually require some form of chemical, thermal or biological pretreatment to enhance their dewaterability. Subsequent processes after dewatering usually depend upon the dryness of the solids or other characteristics of the cake to be efficient. It is therefore paramount that the dewatering process be properly designed and optimized. When optimizing a belt filter, the major considerations are cake dryness and mass throughput rate. The efficiency of a belt press is therefore a function of quantitative cake characteristics, as well as, qualitative parameters, such as ability to release and be transported from the belt.

While the terms water, dewater and sludge are used herein, it will be recognized that these terms are interchangeable in concept with the words liquid, concentrate and solids.

The use of horizontal belt filters to remove liquids, such as water, from slurries containing solids is well known and widely practiced. It also is known to cover and press the slurry on the belt filter with a second belt to form what is conventionally known as a belt filter press.

A belt filter press is usually employed as part of a continuously operated process for removing liquids from solids. In the most general case, the process equipment consists of a continuous flow conditioner where coagulant aids, such as polyelectrolytes, are introduced into the slurry; a mixing unit where the coagulant aid is contacted with the slurry to coagulate the solids; a gravity drainage zone where liquid is drained by gravity from the solids on a filter belt to form a solids cake; and a press zone where a second moving belt covers the solids cake and the pair of belts, with the solids cake between them, are pressed between rollers to deform the solids cake and remove additional liquid. The solids cake emerging from the press zone is then removed from the belts, usually with the aid of a scraper.

In the press zone, the solids cake is subjected to a variety of forces and pressures including radial shear, flexing or bending, and pressures perpendicular to the face of the rollers. In addition, as the solids cake passes through the rollers, it is alternately exposed to pressures of high and low magnitude. These forces and pressures, which include bending, shear and normal forces and the freedom of the sludge to migrate laterally on the belt, create the conditions by which the liquid is removed from the solids cake. Deformations of the cake around a roller creates microchannels for water to flow from within the cake to the surface of the cake where it is removed by passing through the belt. The faces of the belts also deform the solids cake while it is passing around the rollers, which aids in the capillary removal of liquid from the surface of the cake. It is noteworthy that in the press zone, the sludge is free to move laterally between the belts (known as migration) and also to penetrate into the weave of the filters (known as extrusion). The migration is advantageous in that sludge becomes exposed to new belt face for water to flow, but has the disadvantage that large amounts of migration ultimately demand a lowering of the mass loading rate a machine can effectively dewater. Failure to account for area migration will result in sludge oozing out the edges of the belts which is inefficient and also causes housekeeping problems. The degree to which a sludge penetrates the weave of the filter determines the release characteristics of the sludge, and the cleanliness of the filter materials, both of these factors affect the efficacy of the pressing operation.

The complex interrelations between the coagulant aid(s) employed, the solids and liquids of the slurries, the physical properties of the filter belt materials, the belt speed, roller dynamics and belt tensioning makes a priori knowledge of the optimum loading rates difficult to obtain. Therefore, when considering the types of data needed to design or to optimize the dewatering process on a particular apparatus, it is desirable to have detailed knowledge of the nature of the slurry, the quantity and type of coagulant aid required, the amount of slurry which can be placed on a unit area of the filter belt per unit time, the amount of liquid removed in the gravity drainage zone, the amount of liquid removed in the pressure zone, the area expansion or migration of the sludge cake, and a qualitative estimate of the capacity of the cake to be released by the belt.

The present methods of obtaining data for design of a full scale process usually involves running the process with the various proposed operational, loading, or conditioning changes on the smallest available model of the full sized apparatus. Operational optimization of existing units usually requires that a running machine be tested at the proposed process conditions. This results in downtime and other undesirable operational problems. It is therefore not practical or economically feasible to gather data by pilot or full scale testing.

In a review of the design and sizing of sludge dewatering equipment in 1978 by Campbell, Rush, and Tew, the authors reported "very little information is reported in the literature on the methodology used to determine full scale requirements . . . " and "bench tests are not available for the generation of design data . . . Pilot scale machines used to test a sludge are usually the smallest full scale machine made by a manufacturer." The state-of-the-art for collecting belt filter design data has not advanced significantly. The Buchner funnel test and the filter leaf test, both designed for vacuum filter simulation, are still being used for belt filter simulation, indicating a persistent need to develop an improved test method and apparatus.

There are currently four methods of testing slurry dewaterability. The first two tests, the Buchner funnel test and the filter leaf test, utilize vacuum pressure across a stationary filter to dewater the slurry or sludge. While useful for testing the application of vacuum filters, these tests do not properly recreate the physical nature of a belt filter press. A third method for characterizing dewaterability is the capillary suction test. The capillary suction test measures the movement of water from a sludge on a blotter paper by capillary action. The rate of mobility of water is measured with conductivity probes. The relationship between the measured rate and the ability to dewater a sludge on a belt filter press is not clear. Pressure cylinders are the fourth type of test available. In these devices, sludge is squeezed at known pressures using a pressure cylinder. These devices fail to adequately represent belt filter press operation because they do not allow for shear stress or migration of these sludges on the filter cloth and the sludge cake or the belt filter deformed. Deformation of the cake and the belt are important in the dewatering process, for these parameters are related to the ability of the cake to release from the belt. Furthermore, the pressure forces applied in a cylindrical test unit are not applied or released with the rapidity which occurs on a full scale belt filter unit. The cycling of forces with time and the differential movement of the two belts with respect to the sludge cake during the filter belt press process create the conditions of pressure, shear and capillary action which cause the sludge to release water.

The removal of liquids, such as water, from a slurry, such as sludge, by a belt filter press is a complex process. Therefore, it is desirable to have a laboratory scale prototype of a belt press apparatus which adequately simulates the complex forces which act to remove liquid in a full scale belt filter press.

There also is an interest and a need to improve the efficiency of the belt filter press process of dewatering slurries. As a result there are a number of patents on improvements in belt filter press equipment.

The Pierson U.S. Pat. Nos. 4,446,023 and 4,472,779 disclose the use of pistons or levels in a belt filter press to move a continuous belt in a stepwise fashion in an effort to improve efficiency.

The Bratten U.S. Pat. No. 4,568,460 discloses a dual pressing system where a continuous belt press is augmented by passing the belt between externally driven pressure plates. The pressure plates are included to squeeze excess water from the cake.

The Pietzsch U.S. Pat. No. 4,861,495 discloses a system which includes a rotating drum within a loop of a moving belt filter cloth to increase shear on the sludge and to keep the belt tension constant and to thus more effectively remove water.

A need still exists for additional improvements which increase the dewatering efficiency of belt filter press equipment. The belt press as currently available on the market is a continuous service apparatus which is constantly fed conditioned slurries and which constantly discharges dewatered cakes and filtrates. The present invention instructs the practitioner how a batch mode filter may be constructed that allows off-line optimization of operational parameters, such as coagulant and addition rate, type of belt material and mass feed rate.

SUMMARY OF THE INVENTION

It is an object of the present invention to disclose a prototype which closely simulates the forces which act to remove liquid from a slurry during a belt filter press process and which can provide laboratory scale data which effectively simulates a full scale belt filter press operation.

It is also an object of the present invention to disclose an improvement which increases the range of belt filter technology by introducing to the practice a method of batch filter operation and an example of how such a device may be constructed. Furthermore, the method of batch dewatering accomplished by pulling the belt fabric over a preexisting sludge or slurry cake that is placed on top of other fabrics, can be used in consort with and will provide certain benefits to continuous belt filter operations.

The prototype of the present invention comprises a support base, a filter belt, a belt which covers the filter belt and to which the forces are applied and transmitted, means for anchoring the belts at one end to the support base, means for exerting variable pulling pressure on the other end of the press belt, a static curved stationary pressure face against which the belts can be pulled, and means for measuring the forces and pressures created when a pulling pressure is put on the other end of the press belt. Suitable drains, screens, and troughs are provided to transmit the filtrate waters to a collection point where they can be measured and analyzed. The preferred prototype design is only an example, a person skilled in the art will recognize that many combinations of the stationary pressure forces, mechanisms of force application, and other technical modifications may be made to achieve the desired effects and that these mechanisms are within the spirit and scope of this invention.

Belt filter presses use a variety of physical forces to extract water from sludges, including perpendicular pressure force, radial shear force, and free movement of the sludge on the belt face. The prototype of the present invention, although simple in construction, permits a sludge or slurry to be tested under conditions which duplicate and provide these known forces, thereby providing good simulation of a full-scale belt filter press operation. The components of the prototype of the present invention may be interchanged to vary the forces.

The prototype of the present invention is more useful in evaluating the dewaterability of slurries, such as pretreated sludges, under conditions which closely simulate a full scale belt press filter process than any known prior art device. The physical design of the prototype creates perpendicular pressure forces, and radial shear forces, flexing or bending, and it also allows for the free movement of the forming solids cake between the belt faces and the free drainage of liquid from both the filter and press belt faces. In addition, the prototype allows an operator to readily substitute belts of different fabrics and to stop the pressing process intermittently in order to obtain relationships between the pertinent parameters and to rapidly change the forces on the solids cake by changing the tension on the belt. Furthermore, the width of the filter belt, the shape and size of the stationary support plate, and the magnitude of the force generating mechanism may be so altered to change the relative forces acting upon the cake. These features make possible a testing procedure which greatly aids in proper full scale equipment design, correct filter belt selection, and suitable conditioning agents.

While especially useful for simulating the use of a belt filter press for the dewatering of sludge residues from the biological treatment of wastewater, the prototype of the present invention also can be used to simulate the use of such equipment for removing liquids from solids generated by other sources, such as pharmaceutical production, mining operations, food production, pulp and paper processing, and any other operation which requires that liquids be extracted from solids.

In addition, to the invention of the prototype which has been described, we also have discovered that the dewatering efficiency of belt filter press equipment can be improved by including in such equipment a pulling zone in which the belts containing the solids cake are pulled against a static curved face to extract water.

Representative of the belt filter press equipment which can be improved by the addition of a pulling zone are those disclosed in the previously mentioned Pierson, Bratten and Pietzsch patents. The pulling zone may be located either before or after the pressing zone.

BRIEF DESCRIPTION OF THE DRAWINGS

In the Drawings:

FIG. 1 is a schematic view of a prototype apparatus of the present invention.

FIG. 2 is a side elevational view of the preferred embodiment of a prototype of the present invention;

FIG. 3 is a top view of the prototype of FIG. 2; and,

FIG. 4 is an enlarged sectional view taken above lines 4—4 in FIG. 3.

DESCRIPTION OF THE PREFERRED EMBODIMENT

In the schematic view of FIG. 1, a prototype apparatus 10 is seen which includes a support base 11 which is shaped to drain water to a drain 12. Water collected from the drain 12 may, if desired, be measured to obtain water release rate data or mass balances. The prototype 10 also includes a curved static pressure face 13, an anchor point 14, a filter belt 15, a press belt 16, means 17 for exerting a pulling force on press belt 16 and force measuring means 18. One end of each of the belts 15 and 16 is anchored to the base 11 at point 19. The other end of the press belt 16 is attached at 20 to the means 17. Attachment of belt 15 at 20 to the means 17 is optional, depending on the desired result.

The means 17 can be a turnbuckle, gear, lever, or motor, located on either side of the anchor point 14, which can be adjusted to apply perpendicular and radial shear force to the belt 16 and optionally to the belt 15 through the force train constituted by 20 and 18. Alternatively, means 17 can be a series of weights hung vertically past a anchor point 14. The force measuring means 18 is used to monitor the forces applied by means 17. The single force measuring means 18 shown may be replaced with multiple force or pressure sensors (not shown) which may be placed at various positions including along the curvature of a curved static pressure face 13 or underneath the filter belt 15. The placement of the various components and the materials or type of sensors employed are flexible and interchangeable.

Still referring to FIG. 1, it can be seen that the relation of the angle of the force train, which comprises means 17 and anchor point 14, may take on different angles with respect to the curved face 13. This may be accomplished, for example, by changing the height of the anchor point 14, or by changing the angle of rotation of the pressure face 13. In one extreme, the pressure face 13 may be a complete cylinder. In FIG. 1, anchor point 14 is shown to be at roughly 90° perpendicular to attachment point 19. One skilled in the art will recognize that altering this angle will change the force distribution on the face 13. In one extreme, the anchor point 14 may be as great as 360° from point 19 and thus be advantageous under certain test conditions.

The belts 15 and 16 may be of one or more layers of fabric, or screen, or water permeable membrane or specially designed media for differential permeability of liquids, solvents or chemicals, which allows the passage of water or other liquids removed from the solids cake as it is pulled against the curved face 13. The filter belt 15 may be of one or more different types of filter materials in one or more layers, depending on the needs of the test. For a complex separation, the filters or membranes may be of different materials and may therefore constitute a method of purifying a complex mixture of liquids.

The choice of whether one or more layers of the press belt 16 is to be attached on the force train is of importance, for this determines the amount of shear force exerted on the solids cake between the layers or belts. The possibility of getting differential shear forces applied by the choice of attachment of layers to the belt 16 may be important for certain applications. Likewise the choice of attaching belt 15 to the force train is optional and has bearing on the distribution of forces.

The pressure face 13 makes it possible to apply back pressure to the forces applied to the belt 16, and thus controls the distribution of forces to the sample. The possibility that the materials of construction, size, shape, and water drainage characteristics of pressure face 13 may be interchanged to facilitate obtaining representative test data for different designs of full scale equipment is an important advantage of the prototype 10. The shape of pressure face 13 has a bearing on the distribution of forces across the test sample which is on the belt 15. The embodiment of FIG. 1 shows a semicircular pressure face 13, however, other shapes may be advantageous for certain applications, and the use of such varied shapes is within the spirit of the present invention. The water drainage capability of pressure face 13 has bearing on the effectiveness of water transfer through the belt 15, in that it may be desirable to relieve the bottom of the filter from ponding, i.e. excess water built up beneath the cake. In simulating a full scale apparatus the pressure face 13, may itself serve as one or more layers of filter material or in the simplest case the face is made of slotted or screened material to allow free flow of liquids.

In operation, samples of the slurry may be placed directly on the pressure face 13, or on or between any of the layers of the filter belt 15 or between the belts 15 and 16. The placement of the sample, either on different layers of the belt 16 or on the face 13, and the position of the sample along the curvature of the face 13, changes the distribution of forces on the sample. With the prototype of the present invention, an operator is free to choose placement of the sample to facilitate obtaining representative data.

If desired, slurry samples may also be placed on or between any other medium, such as filter fabric, and this sample may be placed on the pressure face 13 or between the layers of the belts 15 and 16. In this case, the externally applied media becomes a part of the layers of belt 15 and are considered as such. It is an advantage of this prototype that such a method of sample application is also feasible.

The structure of one or more layers of the belts 15 and 16 or the face 13, or any externally applied layer of media, may be so chosen to duplicate those to be used in the full scale equipment to be simulated. They may also be chosen to serve other purposes, such as to restrict the flow, or create deformation of the cake, or to limit migration of the sample within the belts or on the face 13. This is another advantage of the prototype that the sample may be so restricted, or remain free to flow within the layers of the belts, or the face 13, or any externally applied media, by proper choice of the design of the face 13 or the components of the belts.

A wetted solid held between fabric layers of the belts 15 and 16 or between the belts 15 and 16 and the pressure face 13 will be subjected to shear, bending, and pressure perpendicular to the curve of the pressure face 13. The advantages of such a process are: 1) freedom of movement of the wetted solid cake under the fabric, 2) bending of the solid cake which opens channels in the solid for water movement, and 3) deformation of the fabric which creates capillary movement of liquid through the fabric and away from the cake solid.

In FIGS. 2 to 4 a specific embodiment of the prototype is shown. As seen there the prototype 110 comprises a support base 111, a drain 112, a static curved pressure face 113, a filter belt 115, a press belt 116 and means 117 for exerting a pulling force comprising components 124 to 129.

As can be seen best in FIG. 4, one end of each of the belts 115 and 116 are anchored at point 119 to the support base 111 by clamping them between the pressure face 113 and the support base 111 by the coaction of upright bolts 121 which are secured at one end to the base 111 and which extend through openings in the pressure face 13 and the wing nuts 122 (seen best in FIG. 4). The other ends of the belts 115 and 116 are secured between a plate clamp 123 which is attached by a wire 124 to an S hook 125 which is connected to one end of a set of springs 126. The set of springs 126 can be provided with a scale which indicates the amount of pulling force being exerted so that it can serve as a pressure sensor. The number of springs may be changed, or the spring strength may be changed to alter the total force to be measured. The other end of the set of springs 126 is attached to a cable 127 which is attached to a winch 128. A lever 129 on the winch 128 can be used to supply and vary the pulling force exerted on the belt 115. The components 124 to 129 constitute the pulling force means 17 shown schematically in FIG. 1.

As seen best in FIGS. 3 and 4 the pressure face 113 is curved and static and it has slots 131 best seen in FIG. 3 so that liquid passing through the belt 115 can pass through the pressure face 113 and collect in the reservoir 132 in the base 111 and flow to the drain 112. The pressure face may be made of screen or wire mesh or sloted pipe material to assure adequate water drainage. The diameter of the pressure face may be changed (not shown) which will alter the distributions of force on the sample. Additional pressure sensors (not shown) can be installed at various points on the prototype to measure the forces created at those points.

In order to simulate the forces extant in a full scale belt filter press, it may be desirable to change the components of the present invention.

Table 1 is a summary of some of the relative changes which can be readily made to the prototype. It is not an all inclusive list, i.e., other changes are possible. The major components seen in FIG. 1 which can be altered are the force applied by means 117, the shape and design of the pressure face 113, the belts 115 and 116, and the attachment point 119.

Table 1 shows the relative effect of a change in one component while maintaining the other components constant.

TABLE 1

| Change | Effected Forces | | |
|---|---|---|---|
| | Shear | Pressure | Bending |
| Increase Force | increase | increase | none |
| Decrease Force | decrease | decrease | none |
| Increase belt width | none | decrease | none |
| Decrease belt width | none | increase | none |
| Increase face radius | decrease | decrease | decrease |
| Decrease face radius | increase | increase | increase |

It will be readily apparent to those skilled in the art that the prototype 110 of FIGS. 2-4, makes it possible for an operator to use belts of the same fabric as will be used in a full scale apparatus and to duplicate the various forces which may be created. As a result, valuable laboratory scale data can be obtained by use of the prototype in a fraction of the time required by prior art techniques.

The present invention is further illustrated by the example.

EXAMPLE 1

Waste activated sludge from aerobic suspended growth biological wastewater treatment facilities are notorious for being difficult to dewater. Table 2 gives dewatering data for three test dates on waste activated sludge collected from a municipal wastewater treatment plant. In all three cases the consistency of the sludge differed in terms of the total solids concentration (column 1). The prototype used on this set of tests was that shown schematically in FIGS. 2 to 4 with an 8-inch (width) by 11-inch (length) press belt 116 and similarly dimensioned filter belt 115 which were pulled around a semicircular pressure face 113 with a 6-inch diameter. A polyelectrolyte (cationic emulsion type) was used to coagulate the sludge and to produce drainable water. Dose levels of polyelectrolyte were pre-selected by testing the drainage of water from conditioned sludge across a single piece of belt filter cloth. Column 2 gives the dose of polymer (pounds polymer per dry ton sludge) used in these tests. Column 3 gives the initial volumes of sludge tested. In order to fairly evaluate the potential for sludge treatment on a belt press, the loading rate, or volume/minute per area of belt per minute must be tested. With the addition of mixing water and polymer to the samples, a total initial volume of sample is larger than the initial sludge volume (column 4). Free water is then drained from the coagulated sludge. In these tests, a 4-½ inch diameter circle of filter cloth was loaded to a diameter of 3 or 4 inches with coagulated sludge (column 5). The sludge cakes were then allowed to drain. It is only necessary in this illustration to report the final volume of free water by gravity drainage and these data are provided in column 6.

The sludge cake still formed on the circular filter cloth was then placed on the prototype 110 (FIG. 2) between the belt 115 and belt 116. A pulling force was applied to the upper press belt 116 by moving the lever 129 of the winch 128. The force is then transmitted to draw the belt 116, the cake, the circular filter cloth and the belt 115 against face 113 which causes bending and shearing and pressure to the filters and cake. Columns 7, 8, and 9 (cumulative volumes of released water) show that stepwise application of force from 30 to 60 to 96 pounds resulted in the extraction of water from the sludge for each force applied. The final volume occupied by the solids is reduced (column 10) as compared to the initial volume (column 3). The cake solids are likewise increased (column 11) as compared to the initial concentration (column 1).

It is important that with the prototype of the present invention during a test run, the operator can easily release pressure on the belt 116 with the winch release lever 130 (FIG. 2) to simulate the release of pressure which can occur in a full scale apparatus. This prototype also allows the operator to measure the face diameter of the sludge cake at various points in the test. Column 12 shows data indicating that the sludge cake expands its face area (migration area) by up to 54% as compared to the original diameter (column 5). This migration, or area expansion by the sludge cake, means that on an operating belt, excess free belt area must be available to accommodate the migration. This essentially discounts the initial loading rate which can be made on a belt filter. It will be recognized by those knowledgeable in the art of belt filter dewatering that no other apparatus provides this information on sludge migration.

of attachment 119 of the belts near the pressure face 113 can be varied to affect the character of the dewatering and the pressure face 113 can be made of different curved shapes, including a complete cylinder or oval. The belts 115 and 116 to be used, of course, will generally be of the same fabric and weave as those of the equipment to be simulated and the amount of pulling force to be exerted on the press belt with the winch will be that calculated to produce the forces found in the full scale equipment being simulated. However, the prototype also can be used to evaluate changes to be made in full scale of equipment. It is intended that the invention only be limited by the claims.

REFERENCES

1. Miner, Reid, "Experience with belt filter presses in the pulp and paper industry." *J. WPCF*, Vol. 52, No. 9, 2389–2395, 1980.
2. Lecey, R. W. and Pietila, K. A., "Improving belt-filter-press performance, *Chem. Engr.*, p. 69–72, Nov. 28, 1983.
3. Deutsch, N. D., "Options in belt filter presses, *Water Engineering and Management*, September, 1987, p. 34–37.

TABLE 2

| | | | | | | |
|---|---|---|---|---|---|---|
| | | | Solids and Filtrate Data | | | |
| DATE | INITIAL SOLIDS PERCENT | CATIONIC EMULSION POLYMER DOSE LB/TON POLY. | INITIAL SLUDGE VOLUME (MLS) | INITIAL TOTAL VOLUME (MLS) | INITIAL SLUDGE CAKE DIA. INCHES | CUMULATIVE GRAVITY DRAINED VOLUME (60 SEC) | CUMULATIVE FILTRATE VOLUME PRESSED 30 LBS |
| 15-NOV 1990 | 2.3 | 11.6 | 100 | 109 | 3 | 55 | 85 |
| | | 11.6 | 100 | 109 | | 54 | 82 |
| | | 11.6 | 150 | 164 | | 84 | 126 |
| | | 11.6 | 150 | 164 | | 87 | 125 |
| | | 11.6 | 200 | 219 | | 115 | 164 |
| | | 11.6 | 200 | 219 | | 114 | 172 |
| 20-NOV 1990 | 1.1 | 24.2 | 150 | 162 | 3 | 117 | 148 |
| | | 24.2 | 150 | 162 | | 116 | 144 |
| | | 24.2 | 200 | 216 | | 160 | 194 |
| | | 24.2 | 200 | 216 | | 160 | 198 |
| | | 24.2 | 250 | 270 | | 201 | 240 |
| | | 24.2 | 250 | 270 | | 202 | 246 |
| 27-NOV 1990 | 1.2 | 27.8 | 75 | 83 | 3 | 50 | — |
| | | 27.7 | 133 | 147 | 4 | 95 | 126 |
| | | 27.7 | 100 | 110 | 3 | 69 | 92 |
| | | 27.6 | 178 | 196 | 4 | 129 | 165 |
| | | 27.8 | 150 | 165 | 3 | 107 | 141 |
| | | 27.8 | 267 | 293 | 4 | 195 | 248 |

| DATE | CUMULATIVE FILTRATE VOLUME PRESSED 60 LBS | CUMULATIVE FINAL FILTRATE VOLUME 90 LBS | FINAL SLUDGE CAKE VOLUME (MLS) | FINAL CAKE SOLIDS % DRY | MIGRATION AREA/AREA |
|---|---|---|---|---|---|
| 15-NOV 1990 | 89 | 94 | 15 | 13.0 | 1.54 |
| | 84.5 | 87 | 22 | 13.5 | |
| | 132 | 135 | 29 | 13.8 | 1.24 |
| | 130 | 134 | 30 | 14.2 | |
| | 169 | 175 | 44 | 13.7 | 1.34 |
| | 176 | 180 | 39 | 13.7 | |
| 20-NOV 1990 | 150 | 154 | 9 | 12.4 | 1.09 |
| | 147 | 149 | 13 | 11.9 | |
| | 197 | 201 | 15 | 13.1 | 1.17 |
| | 201 | 202 | 14 | 12.6 | |
| | 244 | 249 | 22 | 12.8 | 1.26 |
| | 249 | 251 | 19 | 12.6 | |
| 27-NOV 1990 | 74 | 77 | 6 | 11.0 | 1.11 |
| | 131 | 137 | 10 | 10.8 | 1.04 |
| | 96 | 101 | 9 | 11.6 | 1.10 |
| | 172 | 179 | 17 | 11.6 | 1.03 |
| | 144 | 149 | 17 | 12.5 | 1.15 |
| | 257 | 265 | 28 | 12.1 | 1.06 |

It will be apparent to those skilled in the art that the foregoing description and example have been for purposes of illustration and that a number of modifications and changes can be made without departing from the spirit and scope of the invention. For example, the point 4. ASCE Task Force on Belt Filter Presses, "Belt filter press dewatering of wastewater sludges", p. 991-1006, ASCE, *J. Env. Engr.*, Vol. 114, No. 5, October, 1988.
5. Campbell, H. W., Rush, R. J., and Tew, R. "Sludge Dewatering Design Manual," Project No. 75-3-22, Research Program for the Abatement of Municipal Pollution under the Provision of the Canada - Ontario Agreement on Great Lakes Water Quality, p. 93, section 5.6, 1978.
6. Kelloy, S. R. "Sludge Management, Changing Times," *Pollution Engineering*, November, 1989, p. 52-68.
7. Pierson, Henri G. W. Endless Belt filter with Stationary Guide Bars, U.S. Pat. No. 4,472,279, Sep. 18, 1984.
8. Pierson, Henri, G. W. Vacuum Belt Filter, U.S. Pat. No. 4,446,023, May 1, 1984.
9. Bratten, Jack R. Filter Apparatus and Method, U.S. Pat. No. 4,568,460, February, 1986.
10. Pietzsch, K. E. Press Belt Device for Horizontal Filters, U.S. Pat. No. 4,861,495, Aug. 29, 1989.

We claim:

1. An apparatus for simulating the removal of liquid from a liquid slurry with a full scale belt filter press, said apparatus comprising
   (a) a support base;
   (b) a filter belt having a first and a second end;
   (c) a press belt for covering the filter belt having a first and a second end;
   (d) means anchoring the first ends of the filter belt and the press belt to the support base;
   (e) means for exerting a pulling force on the second end of the press belt; and
   (f) a static curved pressure face located between the means anchoring the belts and the means for exerting a pulling force on the press belt, said face raising above the support base and providing a belt supporting surface against which the press belt can be pulled to exert a deliquifying pressure upon a sample of a liquid slurry on the filter belt.
2. An apparatus of claim 1 in which the filter belt has more than one layer.
3. An apparatus of claim 1 in which the press belt has more than one layer.
4. An apparatus of claim 1 which includes pressure sensing means operatively connected between said second end of the press belt and the means for exerting a pulling force.
5. An apparatus of claim 1 in which the means for exerting a pulling force is adjustable.
6. An apparatus of claim 1 in which the means for exerting a pulling force is a winch.
7. An apparatus of claim 1 in which the support base includes a reservoir for collecting liquid from the belt and a drain.
8. An apparatus of claim 1 in which the static curved pressure face contains passages through which liquid from the belt can flow.

* * * * *